Nov. 23, 1965     H. MERKER     3,219,317
CABLE HOLDER FOR CABLE CARRIAGES
Filed April 22, 1963     5 Sheets-Sheet 1
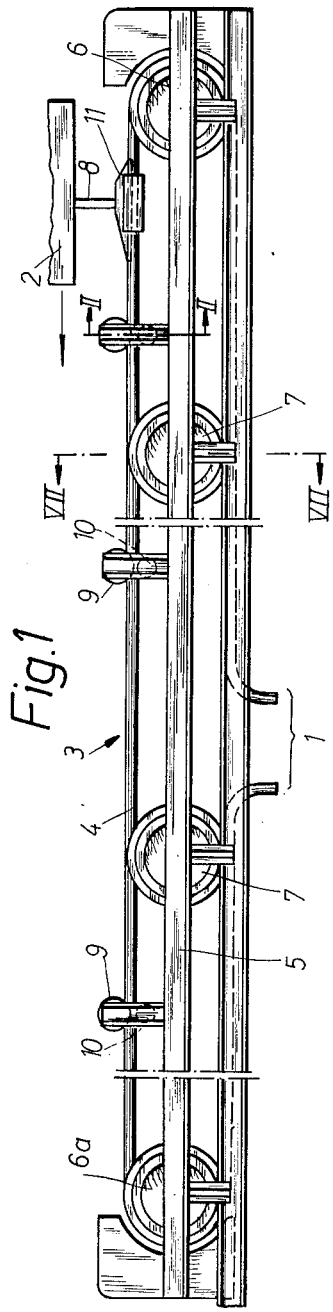
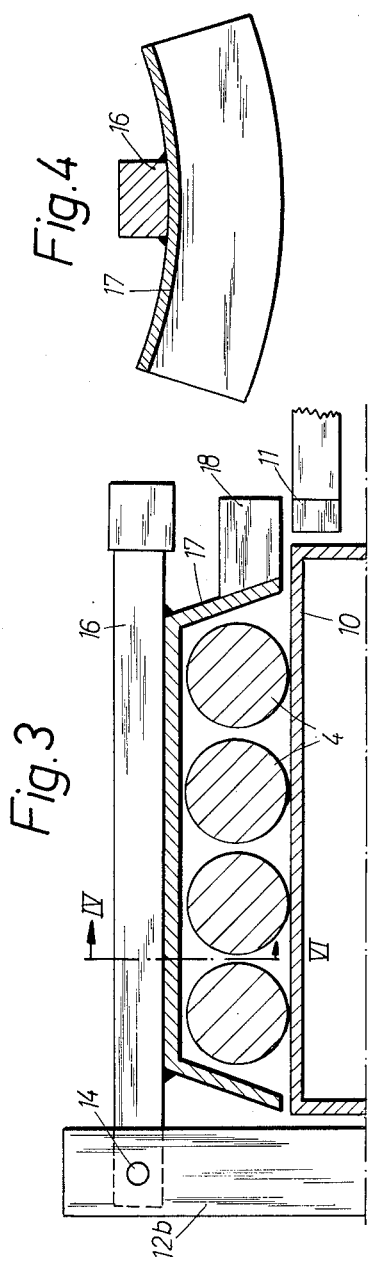

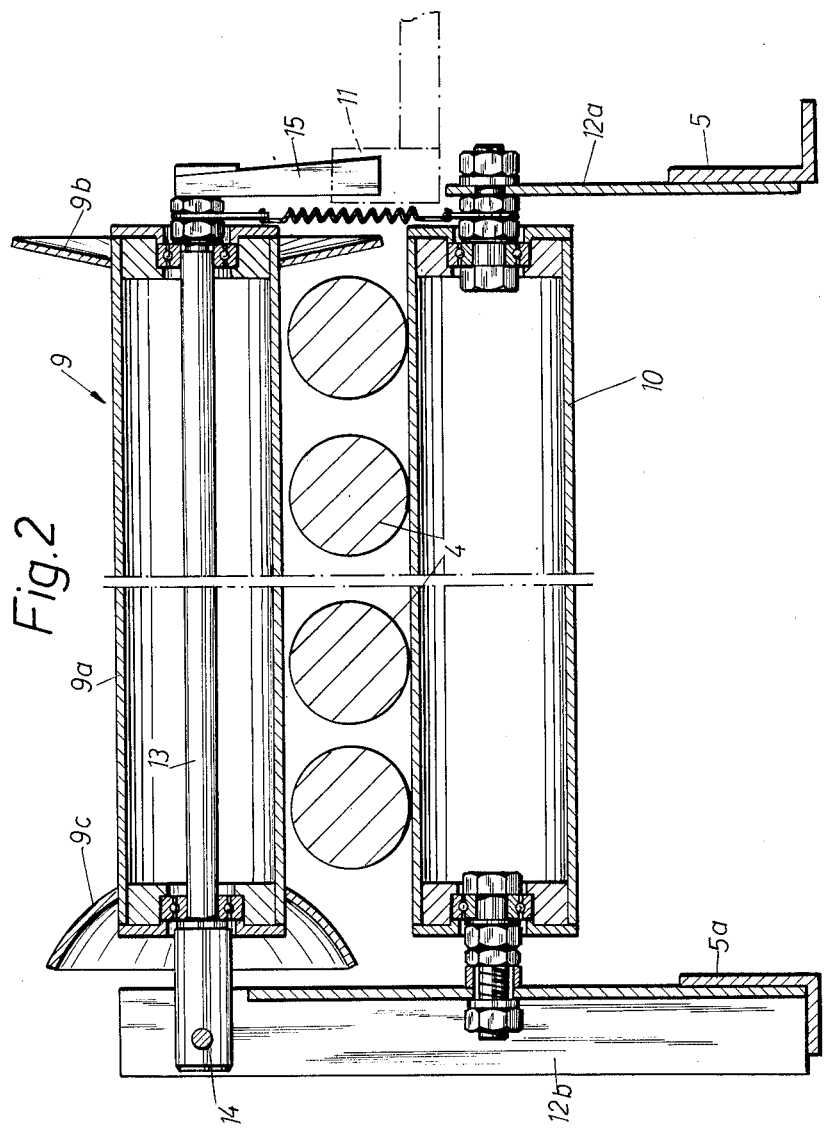

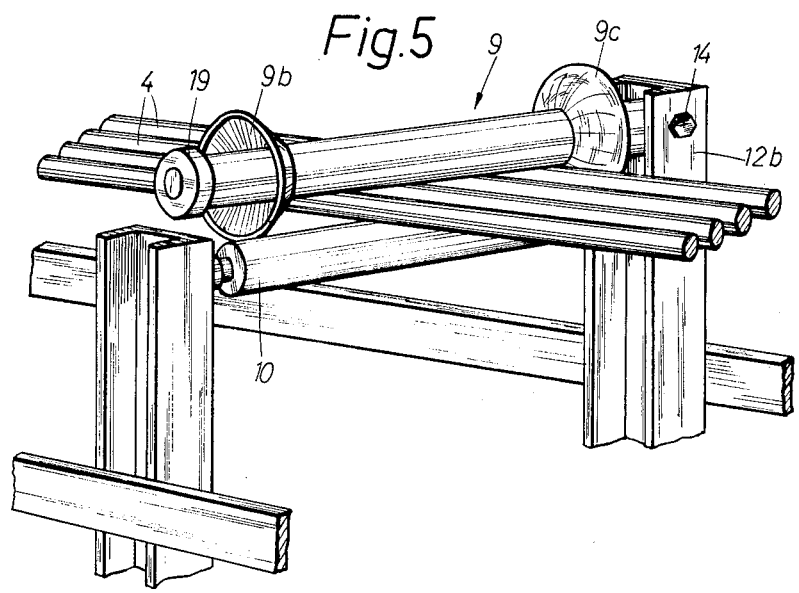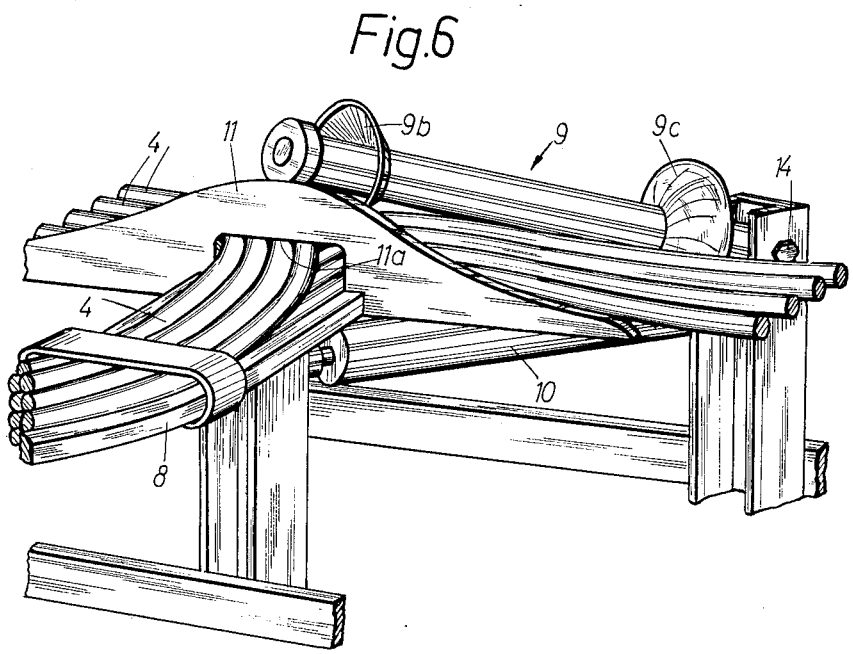

Nov. 23, 1965  H. MERKER  3,219,317
CABLE HOLDER FOR CABLE CARRIAGES
Filed April 22, 1963  5 Sheets-Sheet 5
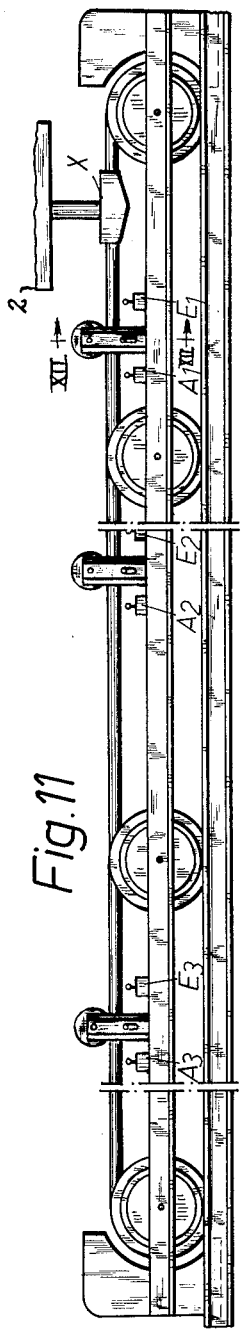
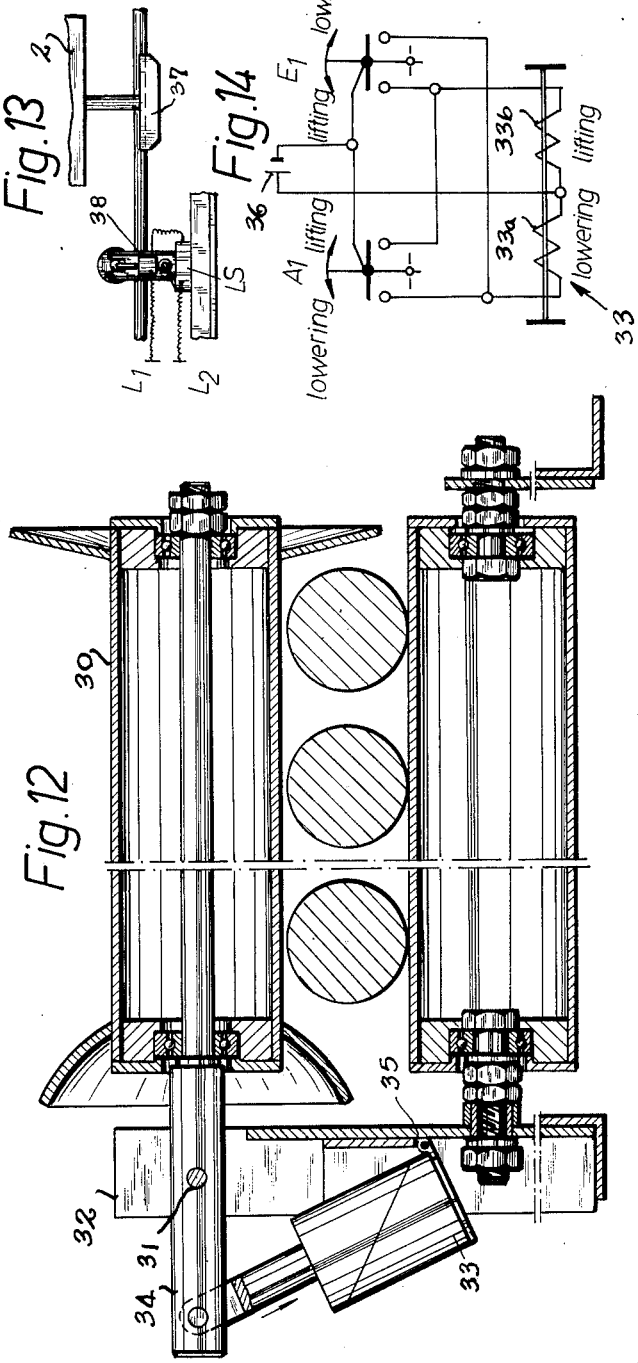
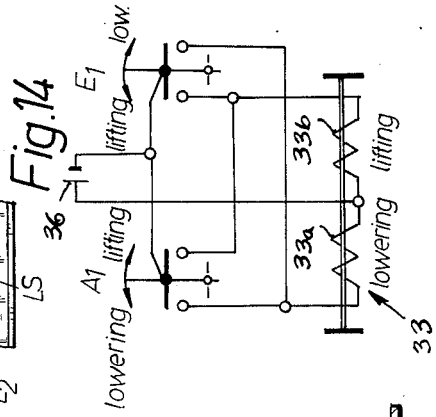
INVENTOR.
HERBERT MERKER United States Patent Office 3,219,317
Patented Nov. 23, 1965

3,219,317
CABLE HOLDER FOR CABLE CARRIAGES
Herbert Merker, Siegen, Westphalia, Germany, assignor to Kabelschlepp G.m.b.H., Westphalia, Germany
Filed Apr. 22, 1963, Ser. No. 274,581
Claims priority, application Germany, Apr. 25, 1962, K 46,564
12 Claims. (Cl. 254—190)

The present invention relates to a cable carriage or trailer and, more specifically, to holding means on a cable carriage or trailer for preventing distortion and undue movement of cables, hoses and the like as they are supported by cable carriages in installations with a movable consumer, for instance cranes, machine tools, construction machinery, and the like.

With arrangements of the above-mentioned types in which the cables and hoses are relieved by corresponding pulling means, the never-fully-avoidable twist inherent to the cables and hoses makes itself felt in an annoying manner by the tendency of the loosely guided cables and hoses to tilt up or rear and thereby to cause warping.

In connection with cable carriages of the above-mentioned general type, it is known to provide rollers for counteracting the above-mentioned tendency and to journal such rollers at both ends thereof. Such holding rollers are arranged between the reversing rollers and additional supporting rollers for the energy conductors and located adjacent to said reversing rollers. More specifically, such holding rollers are arranged within a region over which the follower or dog for the cable packets, or the like, on the movable consumer, does not pass. Such holding rollers cannot be arranged in the central portion of the carriage because they interfere with the guiding of the cables, or the like, to the movable consumer.

It is, therefore, an object of the present invention so to design and arrange the holding means for counteracting the above-mentioned tilting and warping tendency that the holding means may be arranged at any convenient location of the carriage.

It is another object of this invention to provide holding means as set forth in the preceding paragraph, which will exert no undue wearing action on the energy conductors.

It is still another object of this invention to provide holding means as set forth above which will, at a desired time, disengage the energy conductors.

These and other objects and advantages of the invention will appear more clearly from the following specification in connection with the accompanying drawings, in which:

FIGURE 1 represents a diagrammatic illustration of a cable carriage with holding means according to the present invention;

FIGURE 2 is a section taken along the line II—II of FIGURE 1 but is shown on a scale somewhat larger than the scale of FIGURE 1;

FIGURE 3 is a portion of a section through holding means according to the invention;

FIGURE 4 represents a section taken along the line IV—IV of FIGURE 3;

FIGURE 5 is a perspective view of a modification of the invention;

FIGURE 6 shows the arrangement of FIGURE 5 in a different phase of operation;

FIGURE 11 is an elevational view like FIGURE 1, but shows electrically operated down holding members with limit switch actuators therefor;

FIGURE 12 is a sectional view indicated by line XII—XII on FIGURE 11;

FIGURE 13 is a schematic view showing a different arrangement for controlling the limit switch that, in turn, controls the solenoid actuator for the down-holding roller; and FIGURE 14 is a schematic electrical circuit showing one of the actuating stations of the FIGURE 11 modification.

Figure 7:
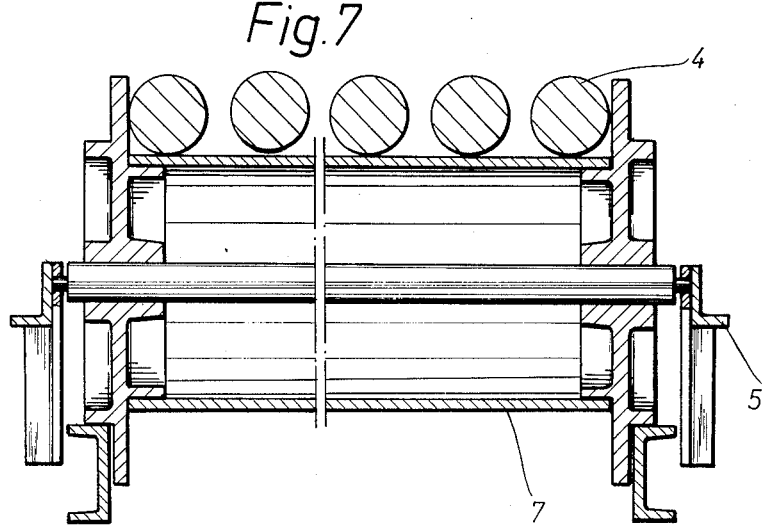
FIGURE 7 is a sectional view indicated by line VII—VII on FIGURE 1.

The holding means according to the present invention is characterized primarily in that it is only unilaterally journalled and is tiltable in upward direction.

Advantageously, the holding means is arranged above a supporting roller of the cable carriage and may be held in its operative position by its own weight or additional weights, or by spring means. The holding means together with the supporting roller confine a passage closed on all sides for the energy conductors. The holding means may be designed as a roller or profiled roller, or as a sliding member or profiled sliding member. For purposes of reducing the friction with and the wear of the energy conductors, the holding means may be equipped with individual rollers. The holding means according to the present invention is provided with a lifter by means of which the lifting of the holding means is effected at an appropriate time. The lifting of the holding means may be effected by electrical control through the intervention of a lifting magnet, or the like, when actuating a limit switch, or the like.

Referring now to the drawings in detail, the arrangement shown therein comprises a movable consumer 2 which is supplied with current, fluid or air from a fixed supply point 1. The supply of energy or the respective medium is effected by means of a cable carriage 3 over which the energy conductors 4, for instance cables or hoses, are passed. The arrangement is such that one cable section passes from the fixed supply point 1 to the consumer via one end roller 6 of the carriage, whereas the other cable section passes from the offset supply point 1 to the consumer via the other end roller 6a.

The cable carriage comprises a frame 5 carrying the end rollers 6 and 6a and also carrying supporting rollers 7 serving as wheels. The movable consumer 2 is equipped with a follower or dog 8 by means of which the energy conductors 4 are passed to the movable consumer 2.

In conformity with the present invention, above the energy conductors 4 there are provided holding means 9 for holding said energy conductors down. The said holding means 9 are preferably arranged above supporting rollers 10 supporting the energy conductors 4. In conformity with the length of the carriage 3, three or more holding means may be provided between each two adjacent rollers 7 or 6, 7. Connected to the follower or dog 8 is a cam member 11 by means of which the holding means 9 may be lifted. Advantageously, the portions of the energy conductors 4 which pass from the cable carriage to the movable consumer 2 are passed through a cutout 11a in the cam member 11.

FIG. 2 illustrates a holding-down means 9 in the form of a roller. Arranged on frame 5, 5a of the carriage 3 are supports 12a and angle irons 12b for supporting the supporting roller 10. The angle iron or support 12b is somewhat higher than the right-hand supports 12a and at its upper end carries a shaft 13 which extends transversely to the energy conductors 4 and above the same. Shaft 13 is pivotally supported by a bolt 14 so as to be tiltable thereabout. Rotatably mounted on shaft 13 is a holder 9 which comprises a tubular member 9a and lateral conically shaped bodies 9b and 9c. Advantageously, the body 9c is designed as a spherical hollow body having its center located in bolt 14 so that the body 9c will not engage or penetrate into the adjacent cable sections, or the like, when the holder 9 is tilted about the pivot 14. Supporting roller 10 and holder 9 together with the bodies 9b and 9c form a closed profile for the passage of the energy conductors 4. Mounted at the free end of shaft 13 is a lifter 15, or the like which, when the cam member 11 fixedly connected to the movable consumer 2 passes between a supporting roller 10 and the holder 9, may be tilted upwardly to such an extent that the cable portions passing through the cam member 11 may pass unimpededly. After passage of the cam member 11, the holder 9 will, due to its own weight or by means of an additional weight (not shown) or due to the effect of a spring, again move downwardly toward the energy conductors.

According to the embodiment illustrated in FIGS. 3 and 4, the holder 9 of the FIG. 2 arrangement has been replaced by tiltable holding means 16 pivotally connected by pivot 14 to support 12b. The holding means 16 has to the bottom thereof connected for instance by welding, U-shaped profiled sliding member or shoe member 17. Between member 17 and supporting roller 10 there is likewise formed a closed space for the energy conductors 4. In order to prevent the energy conductors from engaging the sharp edges of the sliding member 17, the sliding member 17 is arched in axial direction of the cables 4. The free end of the U-shaped profiled member 17 is provided with a nose 18, or the like, adapted to be acted upon by the cam member 11 so as to lift the holding means 16 upwardly in order to permit the free passage of the energy conductors similar to the manner described above in connection with FIGS. 1 and 2.

The inner side of sliding member 17 which faces the cables 4 may be provided with rollers or the like for reducing friction.

According to the embodiment of FIGS. 5 and 6, the holding means is designed as roller 19 the axis of which intersects the axis of the pivot 14. The cam member 11 (FIG. 6) through which the cable sections 4a are passed to the movable consumer 2 is supported by the follower arm 8.

If an electric lifting mechanism is provided, a cam member similar to the cam member 11 actuates limit switches, or the like, in a manner known per se which, their turn, close the circuit for motors or lifting magnets in order to lift the holder 9. After the completed passage of the cable section 4a, said switches are opened again so that the holder 9 will be returned to its operative position shown in FIGS. 2, 3 or 5.

Figure 8:
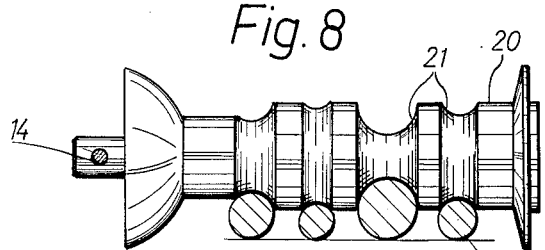
FIGURE 8 is an elevational view showing a profiled holding-down roller.

In FIGURE 8 there is shown a down-holding roller 20 which is formed with axially spaced groove means 21, which engage the flexible conduits 4 and retain them in position.

Figure 9:
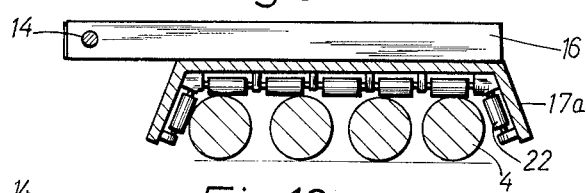
FIGURE 9 is a view showing a holding-down member in the form of an inverted trough similar to that of FIGURE 3, but with rollers in the trough.

In FIGURE 9 the down-holding member is in the form of an inverted trough 17a carried by a holding means 16 and similar to trough 17 of FIGURE 3, except that trough 17a has rotatably mounted therein a plurality of friction reducing roller means 22 for engagement with the conduits or energy conductors 4.

Figure 10:
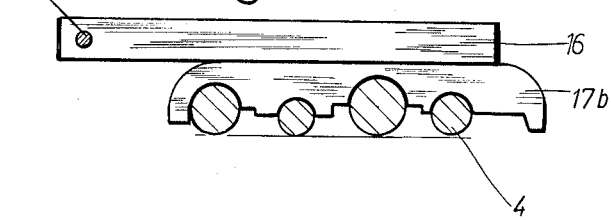
FIGURE 10 shows a profiled holding-down bar.

FIGURE 10 shows an arrangement, wherein the down-holding elements 17b is in the form of a profile bar which engages the energy conductors 4.

The arrangement shown in FIGURE 11 is similar to what is illustrated in FIGURE 1 and the same reference numerals are employed where applicable. In the structure of FIGURE 11, shown in more detail in FIGURE 12, each down-holding roller 30 is pivotally supported at 31 at one side of the frame of the device on frame member 32. A solenoid armature combination 33 has one part pivotally connected to the out-board end of shaft 34 of down-holding member 30 and the other part pivotally connected at 35 to the frame of the margin.

It will be evident that energization of the solenoid will lift the down-holding member 30 while de-energization of the solenoid will permit the down-holding member 30 move downwardly. The down-holding member may, furthermore, latch or hold in its upper-most position and be released therefrom by actuation of a suitable limit switch.

In FIGURE 11 a cam X is provided, which is carried with moveable consumer 2. On the right side of each of the down-holding roller stations is provided a limit switch, designated E1, E2, E3 in FIGURE 11, whereas, on the left side of each station in another limit switch, designated as A1, A2, A3, in FIGURE 11.

The arrangement of these limit switches in circuit with the solenoid means for the down-holding rollers is illustrated in FIGURE 14. In FIGURE 14 the solenoid means 33 is made up of a lowering solenoid 33a and a lifting solenoid 33b. The connections of these solenoids to the pertaining limit switches E1 and A1, and a source of voltage 36, is such that when cam X is moved leftwardly by consumer 2 it will tilt switch E1 toward the left and energize lifting solenoid 33b. Thereafter, cam X will tilt switch A1 to the left and will energize lowering solenoid 33a. The down-holding rollers will, thus, lift as consumer 2 approaches from the right and will aagin lower as consumer 2 recedes toward the left. When consumer 2 is moving in the opposite direction, switches A1 and E1 are operated in the opposite order and are tilted in the respective opposite direction and this will effect energization of lifting solenoid 33b as the consumer approaches each down-holding roller from the left and will energize lowering solenoid 33a as the consumer recedes from the down-holding roller from the right.

In FIGURE 13, the consumer 2 carries a cam 37 which is relatively elongated and which serves for closing a limit switch LS at the pertaining down-holding roller station, thereby to energize lifting solenoid 38 as the consumer approaches the station. Cam 37 will hold switch LS closed until the consumer has moved to the point that the down-holding roller can move downwardly and at this point cam 37 will release limit switch LS to its open position.

It is, of course, to be understood that the present invention is, by no means, limited to the particular constructions shown in the drawings, but also comprises any modifications within the scope of the appended claims.

What I claim is:

1. In combination with a movable station: trailer means having roller means for passing flexible conveying means thereover, especially cables and hoses, from a fixed station to said movable station, said trailer means also comprising frame means, down-holding means for bearing down on said conveying means when passing over said roller means, one end of said down-holding means being pivotally connected to said frame means for permitting tilting movement of said down-holding means in a vertical plane, and control means connected to said movable station so as to be movable therewith, the free end of said down-holding means being provided with means arranged in the path of movement of said control means and operable thereby for tilting said down-holding means upwardly.

2. In combination with a movable station trailer means having roller means for passing flexible conveying means, especially cables and hoses, from a fixed station to said movable station, said trailer means also comprising frame means, down-holding means for bearing down on said conveying means when passing over said roller means, one end of said down-holding means being pivotally connected to said frame means for permitting tilting movement of said down-holding means in a vertical plane, control means connected to said movable station so as to be movable therewith, limit switch means arranged in the path of said control means and operable thereby, and means operatively connected to said down-holding means and operable in response to engagement of said limit switch means by said control means to tilt said down-holding means upwardly.

3. In a trailer having roller means over which flexible conveying means such as cables and bores pass from a fixed station to a movable station; said trailer having frame means in which said roller means are mounted, and down-holding means carried by the frame means and bearing on said conveying means passing over said roller means in confining relation thereto, one end of said down-holding means being pivotally connected to said frame means for permitting tilting movement of said down-holding means in a direction away from said conveying means, and means actuated by said movable station for tilting the respective down-holding means away from said conveying means when said moveable station passes thereby to permit the conveying means to be led from the moveable station into and out of the space confined by said down-holding means.

4. An arrangement according to claim 3, which includes weight means connected to said down-holding means toward the axis of rotation of said roller means, and into confining engagement with said conveying means.

5. An arrangement according to claim 3, which includes spring means operatively connected to said down-holding means and continuously urging said down-holding means toward the axis of rotation of said roller means and into confining engagement with said conveying means.

6. In a trailer having roller means over which flexible conveying means such as cables and bores pass from a fixed station to a moveable station; frame means, additional roller means supported by said frame means and having their axes of rotation extending in a direction transverse to the longitudinal direction of said trailer for additionally supporting said conveying means, and down-holding means arranged above said additional roller means for bearing down on conveying means passing over said additional roller means in confining relation thereto, one end of said down-holding means being pivotally connected to said frame means for permitting tilting movement of said holding means in a vertical plane, and means actuated by said moveable station for tilting the respective down-holding means upwardly when said moveable station passes thereby to permit the conveying means to be led from the moveable station into and out of the space between said down-holding means and the said additional roller means therebeneath.

7. An arrangement according to claim 6, in which each of said additional roller means together with the respective down-holding means pertaining thereto confines a substantially closed passage for confining flexible conveying means in substantially parallel coplanar relation while passing through said passage.

8. An arrangement according to claim 3, in which said down-holding means is in the form of roller means.

9. An arrangement according to claim 3, in which said down-holding means is in the form of a roller having annular grooves to receive said conveying means.

10. An arrangement according to claim 3, in which said down-holding means is in the form of a shoe member slidably engaging said conveying means.

11. An arrangement according to claim 3, in which said down-holding means is in the form of a shoe member slidably engaging said conveying means and curved so as to be convex toward said conveying means.

12. In a trailer having roller means over which flexible conveying means such as cables and bores pass from a fixed station to a moveable station; frame means, and down-holding means in the frame means bearing down on said conveying means passing over said roller means, said down-holding means including a plurality of rollers in direct engagement with the conveying means passing over said roller means, one end of said down-holding means being pivotally connected to said frame means for station for tilting the respective down-holding means in a vertical plane, and means actuated by said moveable station for tilting the respective down-holding means upwardly when said moveable station passes thereby to permit the conveying means to be led from the moveable station into and out of the space beneath said down-holding means.

References Cited by the Examiner
UNITED STATES PATENTS

| 504,190 | 8/1893 | Alexander | 254—190 |
|---|---|---|---|
| 2,816,734 | 12/1957 | Crofoot | 254—190 |

FOREIGN PATENTS

| 1,065,050 | 9/1959 | Germany. |
|---|---|---|
| 1,120,536 | 12/1961 | Germany. |

SAMUEL F. COLEMAN, *Primary Examiner.*